Dec. 9, 1969    T. P. FOLEY    3,483,285
CLAMPING DEVICE AND METHOD
Filed Jan. 6, 1967    2 Sheets-Sheet 1

INVENTOR
Thomas P. Foley

BY Douglas M. Clarkson
ATTORNEY

Dec. 9, 1969
T. P. FOLEY
3,483,285
CLAMPING DEVICE AND METHOD
Filed Jan. 6, 1967
2 Sheets-Sheet 2
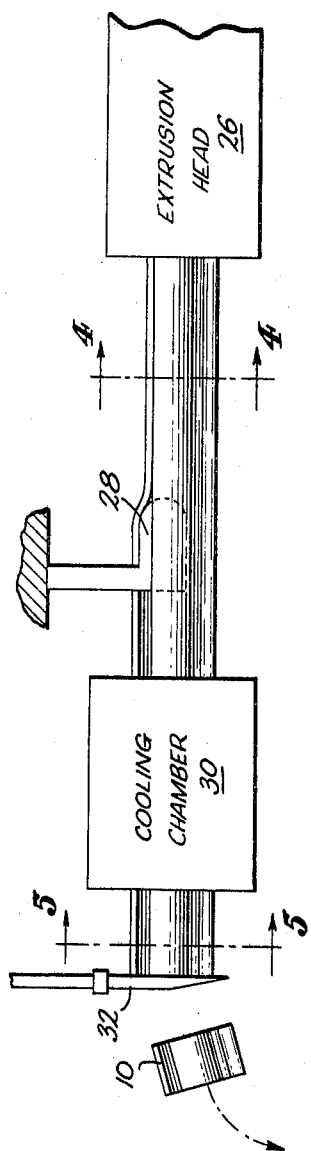
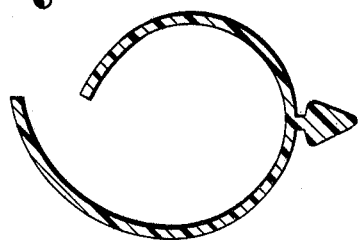
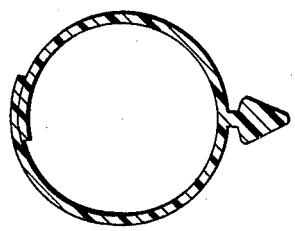
INVENTOR
*Thomas P. Foley*
BY *Douglas M. Jackson*
ATTORNEY

# United States Patent Office 3,483,285
Patented Dec. 9, 1969

3,483,285
CLAMPING DEVICE AND METHOD
Thomas P. Foley, Huntington, N.Y., assignor to Potter Instrument Company, Inc., Plainview, N.Y., a corporation of New York
Filed Jan. 6, 1967, Ser. No. 617,741
Int. Cl. B29f 3/00; B65d 63/00; A44b 21/00
U.S. Cl. 264—146          1 Claim

ABSTRACT OF THE DISCLOSURE

The specification and drawings disclose a heat shrinkable volute clamp for electric wires or the like and a method of manufacturing such a clamp. The method includes extruding the volute member and severing it to desired lengths.

---

This invention, generally, relates to clamping devices and their manufacture. More particularly, the invention concerns heat actuated clamping devices for encircling and retaining such articles as electric conductors, cables and the like, as well as a unique method for forming such devices so that they may be manufactured economically and applied readily in a shop or in the field, as the circumstances may require.

Many diverse types of band clamps have been developed in the past to retain such articles as electric conductors or cables in place on a panel, in a chassis or on other supporting structure. Such clamps have been formed of metal, plastic, rubber, among other materials, and have employed either the inherent resiliency or, in some instances, the malleability of the material from which they are formed, or some type of mechanical latching by which they may be placed about an article and secured to the supporting structure. While prior devices of this type have been satisfactory for their purpose, they have involved either manufacturing techniques which add to their costs or require specialized tools and complicated procedures for their application to an article to be clamped and retained.

In accordance with the present invention, an article retaining clamp is formed by extruding any one of several plastic materials having properties of elastic memory or heat shrinkability to develop a volute or scroll-like crosssection which is closed initially. While the extruded plastic is at an elevated temperature and, in some instances, after it has been subjected to high energy electron beam bombardment, it is expanded to an open position wherein the mouth of the volute is of sufficient size to receive the cables or article to be clamped.

Immediately after such expansion, the extruded shape is cooled so that it sets in this shape. Thereafter, the extrusion is severed into lengths of desired dimensions for use in the shop or field. The extrusion may also incorporate a means, such as a lug or the like of continuous cross-section, to facilitate mounting the clamp thus formed to a supporting panel or the like.

When it is desired to use the clamp to retain an article such as an electric cable, the article is inserted radially through the open mouth of the volute-shaped clamp, and heat is applied by any suitable means, such as a heat gun, so that the material, because of its elastic memory, returns to its original closed condition to encircle the article tightly therein. The clamp may be mounted on the supporting panel either before or after the application of heat, as desired.

It is, therefore, a principal object of the present invention to provide a clamping device for encircling an article to be retained which is applied simply and yet is highly effective to secure such elongated articles as electric cables and the like.

Another object of this invention is the provision of a clamping device of a type which may encircle an article, after the article has been received radially in the device, merely by heating the device.

A further object of this invention is to provide a unique method for manufacturing clamping devices of the type referred to.

Still another object of this invention is that of providing a method for making cable retaining clamps which can be applied readily over an elongated article, such as an electric cable or group of electric cables, without threading and by which the device can be made of a length to protect a significant portion of a cable retained.

A still further object of this invention is to provide a generally tubular clamp or sheath, divided longitudinally to facilitate radial placement over an elongated article and formed of heat-shrinkable material so that it contracts about the article simply by subjecting it to heat.

Other objects and further scope of applicability of the present invention will be appreciated from the detailed description to follow taken in conjunction with the accompanying drawings in which.

Figure 1:
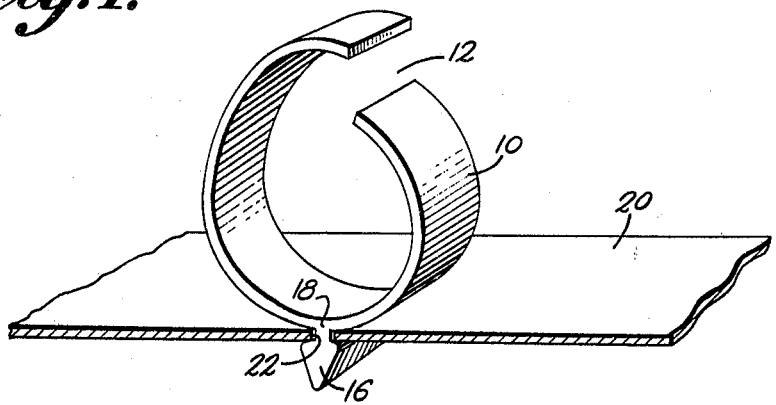
FIGURE 1 is a perspective view of a clamping device in accordance with the invention, shown mounted on a supporting panel.
Figure 2:
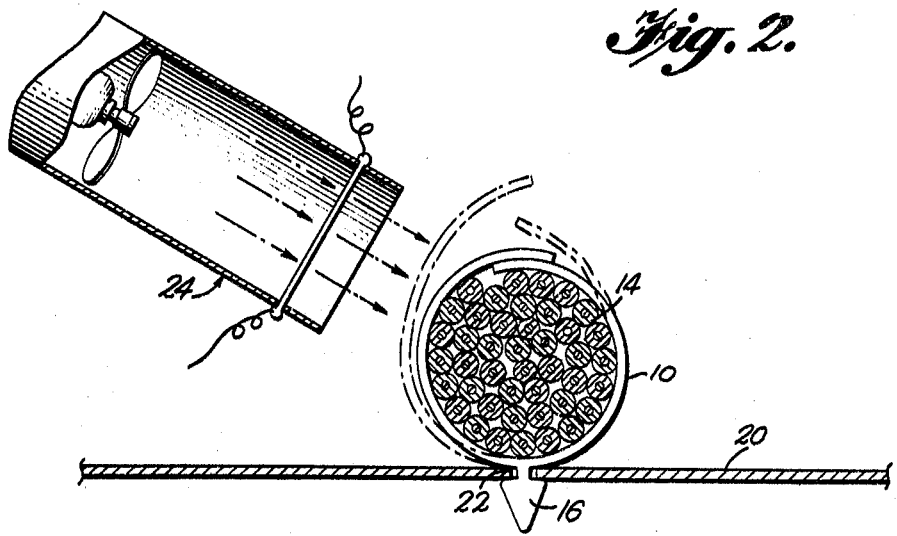
FIGURE 2 is an end view of the clamping device shown in FIGURE 1 after it has been heat actuated to close about a group of cables.

FIGURE 3 is a schematic view illustrating a method of making the clamping device shown in FIGURES 1 and 2; and FIGURES 4 and 5 are enlarged cross-sectional views taken along lines 4—4 and lines 5—5, respectively, in FIGURE 3.

As shown in FIGURE 1 of the drawings, a preferred embodiment of the clamping device of this invention takes the form of a volute or scroll-shaped member 10 initially having an open mouth 12 of a sufficient size so that articles such as a group of cables 14 (FIGURE 2) may be received radially within the volute member 10. The material from which the volute member 10 is formed will be described in more detail below, but it will suffice at this point to note that the material possesses some resiliency.

It will be appreciated, therefore, that the volute member 10 may be flexed to some degree in the vicinity of the opening 12 during the introduction of an article into the volute member 10, and hence, the specific size of the opening 12 is not critical. A radially projecting rib 16 is formed integrally at the base of the volute member 10 and is shaped with a reduced neck portion 18 so that the volute member will be mounted on a support, such as a panel 20 having a slot 22 formed of a width only slightly greater than the lateral dimension of the neck 18.

The material from which the volute member 10 is formed is of the type possessing elastic memory. Examples of such materials are polyolefin, polyvinyl chloride, polyester, fluorocarbon and polyvinylidene fluoride plastics and silicon, fluorosilicon and neoprene rubbers. Such heat-shrinkable materials have the property, after having been expanded at elevated temperatures and cooled to freeze or set them into the expanded shape, for returning to their original shape and size upon the application of heat.

Improved properties can be obtained with some of these materials by subjecting them to high energy electron beam bombardment to produce cross-linked polymers. After bombardment, an article made of these materials is expanded at the elevated temperatures and cooled to hold them in the enlarged shape. Then, heating the article to a temperature above the material's crystalline melting point, triggers the elastic memory so that the material returns to its original size and shape.

The principal advanage of material which has been subjected to electron bombardment is that it no longer melts, but instead withstands temperatures that normally would destroy the same material which had not been bombarded. Other polymeric materials can be made heat-shrinkable, however, without having been subjected to electron beam bombardment.

The manner in which the clamp device of the present invention utilizes the heat-shrinkability properties of such materials as those aforementioned may be apprecated by a comparson of FIGURES 1 and 2 of the drawings. Specifically, the volute member 10 may be formed initially in a closed shape and expanded to the open shape illustrated in FIGURE 1 to establish the opening 12 at elevated temperatures and cooled to retain it in this opening. Then, after an article or articles, such as the cables 14 in FIGURE 2, are in place within the open volute member, heat is applied by a suitable source, illustrated by a heat gun 24 in FIGURE 2, whereupon the volute member returns to its initial, closed position to encircle the cables 14 firmly.

A method by which the clamping device illustrated in FIGURES 1 and 2 may be formed is illustrated by FIGURES 3–5 of the drawings. As shown in FIGURE 3, plastic material having heat-shrinking properties is extruded by an extrusion head 26 through a die having a shape approximately the cross-section illustrated in FIGURE 4 of the drawings. Before the hot extruded material cools and while it is at an elevated temperature, it passes over a mandrel 28 to expand the tubing in the shape shown in FIGURE 5. Such expansion may also be achieved by the introduction of positive air pressure to the inside of the tube. (Closed tubing is sized in this manner when conventionally extruded.) In this case, hot air escaping along the volute opening, at a predetermined rate, will open the volute member to the shape required in FIGURES 1 and 5.

While in this open shape, the extruded material passes through a cooling chamber 30 to freeze or "set" it in this open configuration. Thereafter, the extruded tubing material is severed, such as by a knife 32, into any length that is desired for the clamping device.

In some circumstances, particularly where electron bombardment of the material is called for, it is contemplated that the procedure illustrated in FIGURE 3 would be altered by subjecting long lengths of the extruded material passing from the head 26 to electron bombardment while it retains its initial cross-sectional configuration as illustrated in FIGURE 4 of the drawings. After the length of extrusion has been bombarded in this manner and heated to the proper temperature, it would be expanded (by passage over a mandrel 28 for example), cooled, and severed into the final length of the clamping device desired. In this manner, the lengths of the extruded material could be placed effectively in a vacuum chamber during the electron bombardment operation.

It will be appreciated, therefore, that by this invention there is provided an extremely effective clamping device and method for its manufacture by which the abovementioned objects are fulfilled completely. Not only is the clamping device of this invention effective to retain articles, such as the cables 14, in position with respect to a support, such as the panel 20, but also the volute member 10 could be used by itself to protect certain articles, such as the cables.

If this protection use is desired rather than just a clamping use, longer lengths of the volute member 10 are provided and placed over the length of the article to be protected. Then, when heat is applied such as by the heat gun 24, the volute member closes to provide a sheath completely about the article therein. Of course, the volute member of the invention may be used to encircle an article for other purposes also, such as to provde a suitable insulation function, if desired.

Since the present invention may take a variety of different forms and embodiments, other than those illustrated and described particularly herein, without departing from the true spirit and scope thereof, it will be understood that the foregoing description is illustrative only, not limiting, and that the true scope of the present invention is to be determined by reference to the appended claim.

What is claimed is:

1. The method of forming a clamping device comprising:
   extruding a closed volute member of heat-shrinkable material at elevated temperatures,
   expanding said volute member to form an opening therein while at said elevated temperatures,
   cooling said expanded volute member to cause it to set in said expanded shape, and
   severing said expanded volute member transversely into lengths suitable for the intended use of the clamping device.

References Cited

UNITED STATES PATENTS

| | | | |
|---|---|---|---|
| 2,359,209 | 9/1944 | Ellinwood. | |
| 2,790,286 | 4/1957 | Snyder. | |
| 2,919,473 | 1/1960 | Cole | 156—51 X |
| 3,085,375 | 4/1963 | Harrison | 215—38 X |
| 3,093,448 | 6/1963 | Kirkpatrick | 18—59 |
| 3,169,005 | 2/1965 | Wallach | 248—74 |
| 3,331,105 | 7/1967 | Gordon | 24—16 |

FOREIGN PATENTS 792,266 3/1958 Great Britain.

CHANCELLOR E. HARRIS, Primary Examiner

U.S. Cl. X.R.

24—16, 73; 248—71; 264—150, 249